(12) United States Patent
Herkersdorf et al.

(10) Patent No.: US 7,493,412 B2
(45) Date of Patent: Feb. 17, 2009

(54) METHOD FOR PROCESSING A DATA PACKET

(75) Inventors: Andreas Herkersdorf, Inning am Ammersee (DE); Jan Van Lunteren, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 853 days.

(21) Appl. No.: 10/658,311

(22) Filed: Sep. 9, 2003

(65) Prior Publication Data

US 2004/0107295 A1 Jun. 3, 2004

(30) Foreign Application Priority Data

Sep. 12, 2002 (EP) .................................. 02405795

(51) Int. Cl.
*H04L 12/28* (2006.01)
*G06F 15/173* (2006.01)

(52) U.S. Cl. ...................... 709/238; 709/242; 370/351; 370/395.31

(58) Field of Classification Search ................ 709/242, 709/238; 370/395.31, 351
See application file for complete search history.

(56) References Cited

U.S. PATENT DOCUMENTS

| | | | | |
|---|---|---|---|---|
| 6,181,698 B1 * | 1/2001 | Hariguchi | ................... | 370/392 |
| 6,359,879 B1 * | 3/2002 | Carvey et al. | ............... | 370/351 |
| 6,768,739 B1 * | 7/2004 | Kobayashi et al. | .......... | 370/392 |
| 6,795,447 B2 * | 9/2004 | Kadambi et al. | ............ | 370/412 |
| 6,947,415 B1 * | 9/2005 | Nagaraj | ...................... | 370/389 |
| 6,956,858 B2 * | 10/2005 | Hariguchi et al. | ...... | 370/395.31 |
| 2002/0091856 A1 | 7/2002 | Brown | ......................... | 709/238 |
| 2003/0012145 A1 * | 1/2003 | Bragg | ......................... | 370/254 |
| 2004/0028040 A1 * | 2/2004 | Kumar et al. | ................ | 370/389 |
| 2004/0246931 A1 * | 12/2004 | Thubert et al. | .............. | 370/338 |
| 2005/0047348 A1 * | 3/2005 | Suzuki et al. | ................ | 370/252 |

FOREIGN PATENT DOCUMENTS

| | | |
|---|---|---|
| EP | 1011231 | 6/2000 |
| EP | 1122927 | 8/2001 |

OTHER PUBLICATIONS

Uga, M. Shiomoto, K. A fast and compact longest match prefix look-up method usingpointer cache for very long network address. Computer Communications and Networks. 1999. pp. 595-602.*

(Continued)

*Primary Examiner*—Glenton B Burgess
*Assistant Examiner*—Philip J Chea
(74) *Attorney, Agent, or Firm*—Scully, Scott, Murphy & Presser, P.C.; Lisa M. Yamonaco

(57) ABSTRACT

The invention is directed to methods, apparatus and systems for processing a data packet that has a destination address. In the event that in a routing table cache and in a routing table, there is no entry with a destination address prefix that is a prefix of the destination address, a default-route-prefix is determined in a default-route determination step.

10 Claims, 4 Drawing Sheets

OTHER PUBLICATIONS

IP Caching For Terabit Speed Routers, B. Talbot, T. Sherwood, B. Lin, GlobeCom'99, 1999 IEEE, pp. 1565-1569.

Performance Evaluation Of Hierarchical Caching In High-Speed Routers, E. Besson, P. Brown, Globe Com'98, 1998 IEEE, pp. 2640-2645.

Improving Gateway Performance With A Routing-Table Cache, David C. Feldmeier, InfoCom'88, 1988 IEEE, pp. 298-307.

High-Performance IP Routing Table Lookup Using CPU Caching, Tzi-cker Chiueh, Prashant Pradhan, InfoCom, 1999, IEEE, pp. 1421-1428.

Cache Memory Design For Internet Processors, Tzi-cker Chiueh, Prashant Pradhan, InfoCom 2000 IEEE, pp. 2-7.

Router Plugins: A Software Architecture for Next-Generation Routers, Dan DeCasper, Zubin Dittia, Guru Prulkar and Bernhard Plattner, IEEE/ACM Transactions On Networking, vol. 8, No. 1, Feb. 2000, pp. 135-140.

A Novel Cache Architecture to Support Layer-Four Packet Classification at Memory Access Speeds, Jun Xu, Mukesh Singhal, Joanne Degroat, IEEE, InfoCom, 2000, pp. 1445-1454.

\* cited by examiner

METHOD FOR PROCESSING A DATA PACKET

FIELD OF INVENTION

The invention is directed to processing a data packet towards a routing destination. It is more specifically directed to processing a data packet towards a routing destination, wherein a default-route-prefix is determined for specific data packets.

BACKGROUND OF THE INVENTION

IP-Forwarding is the process in which an Internet router uses the IP destination address of an incoming packet to search a routing-table using a longest-matching prefix search method in order to determine the next router, i.e. next hop, to which the packet shall be forwarded. If no matching prefix is found then the packet is routed according to a so-called "default route".

Two developments can be observed in the routing-table lookup function in Internet routers: First, high search rates for increasing link speeds (OC-192, OC-768, etc.) force the lookup function to use fast but expensive memory such as embedded DRAM and SRAM, having only limited storage capacity. Second, exponentially growing routing-tables force the lookup function to support very large routing-tables. These two developments drive a renewed interest in the use of caches for routing-table lookups.

EP 1122927 is directed to a route lookup engine for determining a next hop. That route lookup engine receives a lookup key and performs a multi-bit trie search with prefix expansion and capture of a variable stride trie.

EP 1011231 describes a method an apparatus providing for router redundancy of non Internet protocols using the virtual router redundancy protocol.

U.S. Ser. No. 20020,091,856A1 describes a default route coding method. A multilevel lookup table includes a plurality of search levels with each search level including a plurality of subtrees, each subtree representing a plurality of nodes. A search of the multilevel lookup table for an entry corresponding to a search key results in a value stored in an entry associated with the node in a subtree. A default value is associated with the root of the subtree. Multiple entries for the subtree can store the default value. To minimize route update time, the default value associated with the subtree is stored in a single location. Instead of storing the default value in multiple entries, each entry stores a use default indicator to indicate that the default value stored in the single location is to be used. To further reduce the number of locations to modify to update the default route, the single location can store an inherit indicator to indicate that the default value for the subtree is inherited from another subtree.

Within enterprise networks, a significant portion of the traffic is likely to be routed according to the default route. The default route, however, does not relate to a specific prefix and is therefore not cached. Consequently, packets that are routed according to the default route, will always result in cache misses.

SUMMARY OF THE INVENTION

The invention provides methods, apparatus and systems for processing a data packet that has a destination address. In the event the destination address lacks a matching destination address prefix in a routing table cache and in a routing table, a default-route-prefix is determined in a default-route determination step. The invention is furthermore directed towards a computer program product comprising program code means for performing the methods and a computer program product comprising the program code means stored on a computer-readable medium.

According to a first aspect of the invention, a method is provided that provides a higher cache hit rate for lookup operations on a routing table and its routing table cache. This is effected by the fact that the method provides default-route prefixes for default-route-directed data packets. The default-route prefixes can be fed to the cache such that subsequent default-route-directed data packets have an increased likelihood of encountering a cache hit and being directed to the default route without having to perform a lookup operation on the routing table. In the following, a matching prefix is defined as a prefix that is a prefix to the destination address.

DESCRIPTION OF THE DRAWINGS

Examples of the invention are depicted in the drawings and described in detail below by way of example, in which.

DETAILED DESCRIPTION OF THE INVENTION

Figure 1:
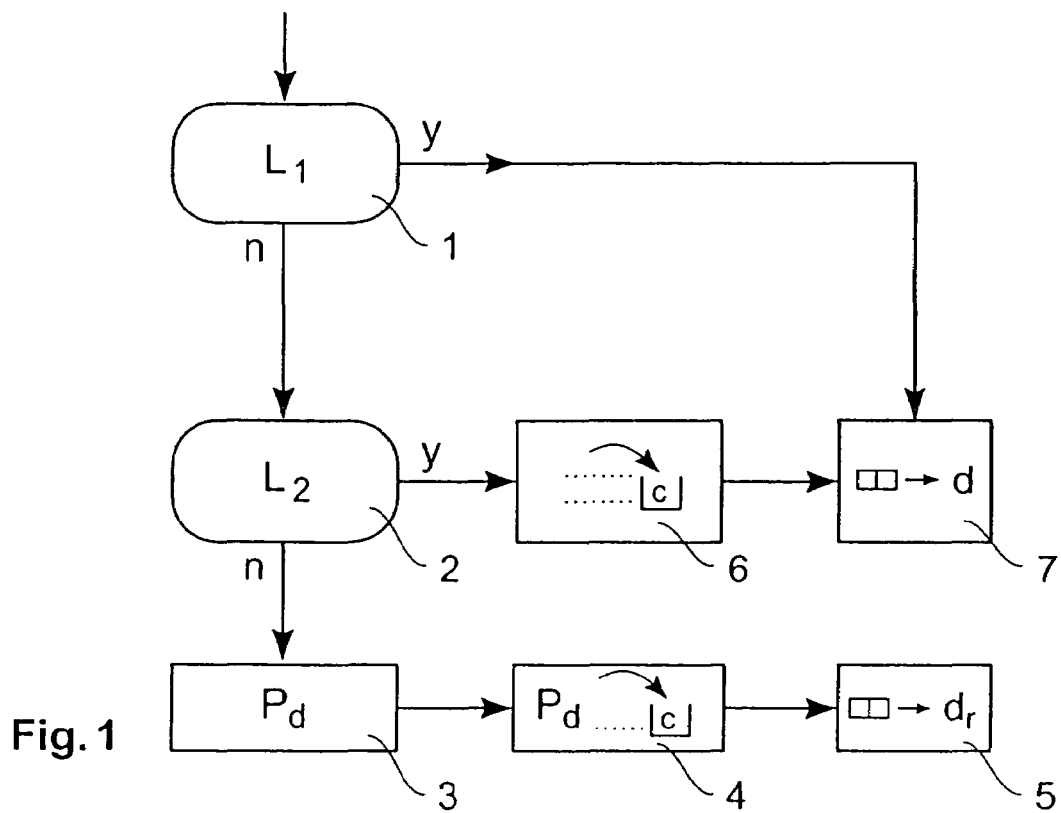
FIG. 1 shows a flow diagram of a method for accelerating default-route packet-forwarding.

The present invention provides methods for processing a data packet that has a destination address. In the event the destination address lacks a matching destination address prefix in a routing table cache and in a routing table, a default-route-prefix is determined in a default-route determination step. The invention is furthermore directed towards a computer program product comprising program code means for performing the method and a computer program product comprising the program code means stored on a computer-readable medium.

In a first embodiment of the invention, a method is provided that provides a higher cache hit rate for lookup operations on a routing table and its routing table cache. This is effected by the fact that the method provides default-route prefixes for default-route-directed data packets. The default-route prefixes can be fed to the cache such that subsequent default-route-directed data packets have an increased likelihood of encountering a cache hit and being directed to the default route without having to perform a lookup operation on the routing table. In the following, a matching prefix is defined as a prefix that is a prefix to the destination address.

It is of advantage if in a first lookup step for the destination address the matching destination address prefix is searched in the routing table cache, and if said first lookup step 1 results in not finding such matching destination address prefix, in a second lookup step for the destination address the matching destination address prefix is searched in the routing table, because by this two-step lookup process, there will be fewer second lookup steps counted over a multitude of data packets which results in a quicker and less resource-intensive forwarding process.

It is advantageous if the second lookup step does not result in a matching destination address prefix, to forward in a default forwarding step the data packet to a default routing destination, because it has been recognized that there is no matching destination address prefix and it makes more sense to forward the data packet to a default destination for further processing, than deleting it. The default destination need not be identical for different data packets. The system may use various default destinations and a selection method may be applied to determine which of the default destinations shall be applied to a specific data packet.

If in a default-route caching step, the default-route-prefix is entered together with the default routing destination as an entry into the routing table cache, the process for forwarding data packets is accelerated, since subsequent data packets heading for a destination address that was not included in the routing table or its cache, but is covered by the entered default-route-prefix will now encounter a cache hit due to the default routing destination entry in the routing table cache, and hence be forwarded to the default destination without having to perform a second lookup step on the routing table. If, however, such a subsequent data packet with a different destination address lacks a matching destination address prefix in the routing table cache and in the routing table, this meaning that its destination address is not covered by the entered default-route-prefix, then another default-route-prefix is determined and entered together with the default routing destination as an entry into the routing table cache. The routing table cache may hence include several default-route-prefix entries. These need not necessarily have the same default routing destination.

If the second lookup step on the routing table results in finding a matching destination address prefix, the found entry is entered into the routing table cache in a cache update step, and the data packet is forwarded in a destination forwarding step to the corresponding routing destination. This procedure provides the advantage that so-called locality is exploited, i.e., it is likely that several data packets in a short time-distance to each other. Such data packets will encounter cache hits and be forwarded to their routing destination without having to access the routing table. This saves time and resources.

If in the first lookup step the routing table cache is searched also for covering path entries that reside in the routing table cache, in their totality covering at least all destination address prefixes existing in the routing table, the cache-misses will be usable for direct default-path forwarding because the covering path entries provide the assurance that in the event of a cache miss, the searched destination address will not exist in the routing table. Hence, a direct default-path forwarding can follow.

In the event that the first lookup step results in finding a matching destination address prefix, the data packet can be forwarded in a destination forwarding step to the corresponding routing destination. This saves time and resources since no second lookup step is necessary.

If in the event that the first lookup step results in finding a covering path entry for the destination address, in a second lookup step for the destination address the matching destination address prefix is searched in the routing table, this second lookup step provides the final distinction between those data packets that encounter a valid routing destination and those data packets which shall be forwarded to the default routing destination.

In FIG. 1 a flow diagram of a method of accelerating default-route packet-forwarding is depicted. A data packet heading for a destination is expected to arrive at an input port of a router. It is the task of the router to direct the arrived packet in accordance with a destination address that the data packet carries with it, to a corresponding routing destination. To achieve this, the router comprises a routing table with entries comprising destination address prefix - routing destination pairs.

In the event that a data packet arrives with a destination address, a first lookup step 1 is performed during which for the destination address d a matching destination address prefix is searched in a routing table cache $L_1$. A match is defined as the case when the destination address prefix is identical to the corresponding number of bits of the destination address d. In many cases the destination address prefix will be shorter than the destination address d.

If the first lookup step on the routing table cache $L_1$ results in a hit, i.e. finding a matching destination address prefix, labeled with "y" in FIG. 1, the data packet is forwarded in a destination forwarding step 7 to the corresponding routing destination. If the first lookup step 1 on the routing table cache $L_1$ results in a miss, labeled with "n" in FIG. 1, the method proceeds with a second lookup step 2.

In the second lookup step 2, for the destination address d a matching destination address prefix is searched in the routing table $L_2$. If the second lookup step 2 on the routing table $L_2$ results in a hit, i.e. finding a matching destination address prefix, labeled with "y" in FIG. 1, the found entry is entered into the routing table cache $L_1$ in a cache update step 6, and the data packet is forwarded in the destination forwarding step 7 to the corresponding routing destination. If the second lookup step 2 does not result in a matching destination address prefix, labeled with "n" in FIG. 1, the corresponding data packet will in subsequent steps be routed according to the default route, i.e. to a default routing destination.

In a default-route determination step 3, a default-route-prefix $P_d$ is derived. Hence, in this step, for the destination address d lacking a matching destination address prefix in the tables $L_1$, $L_2$, the default-route-prefix $P_d$ is determined. The default-route-prefix $P_d$ comprises, as its name states, in most cases only a subset of the number of bits that the destination address d has. It is advantageous to determine the default-route-prefix $P_d$ shorter than the destination address d, such that the default-route-prefix $P_d$ covers more than one destination address, taking into account however, that the default-route-prefix $P_d$ may only cover destination addresses that have no matching destination address prefix in the routing table $L_2$. It is therefore a preferred embodiment to determine the default-route-prefix $P_d$ to be the shortest possible default-route-prefix $P_d$ that satisfies the above condition. Thereby the default-route-prefix $P_d$ covers the maximum of destination addresses.

In a default-route caching step 4, the default-route-prefix $P_d$ is entered together with the default routing destination as an entry into the routing table cache $L_1$.

In a default forwarding step 5 the data packet is afterwards forwarded to the default routing destination.

Figure 2:
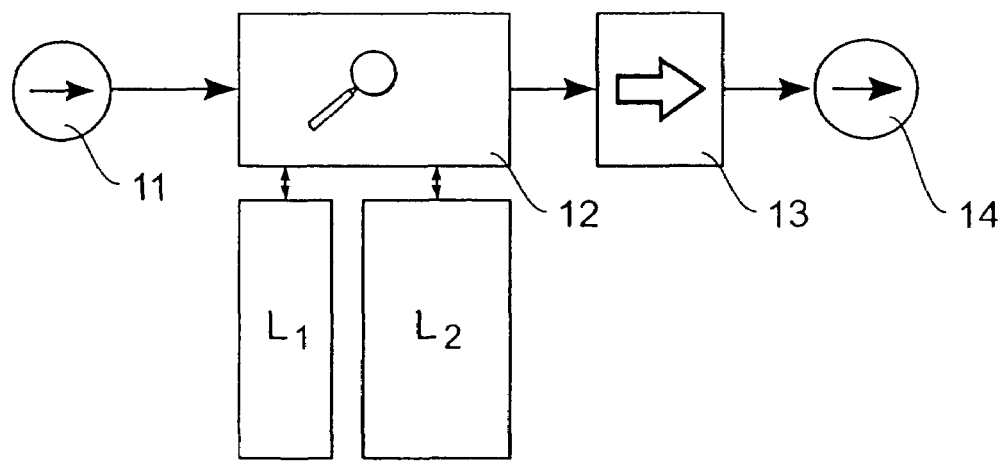
FIG. 2 shows a block diagram of an arrangement for routing data packets in accordance with a routing table.

In FIG. 2, a router is depicted with a data packet input 11 leading via a route lookup engine 12 and a packet forwarding engine 13 to a data packet output 14. The route lookup engine 12 has access to the routing table $L_2$ and the routing table cache $L_1$. Once a data packet has arrived via the data packet input 11, the route lookup engine 12 uses the destination address for its lookup operation, accessing the routing table $L_2$ and the routing table cache $L_1$. Dependent on the result of the lookup operation, the route lookup engine 12 delivers a routing destination address for the data packet. The packet forwarding engine 13 uses that routing destination address to direct the data packet to a data packet output 14.

The method of accelerating default-route packet-forwarding will hereinafter be explained in more detail using an example of a longest-matching prefix search, using a 4-bit search key, on the routing table $L_2$ including here the following three prefixes in binary notation:

| prefix 1: | 001 | (length 3) |
| prefix 2: | 0111 | (length 4) |
| prefix 3: | 11 | (length 2) |

Figure 3:
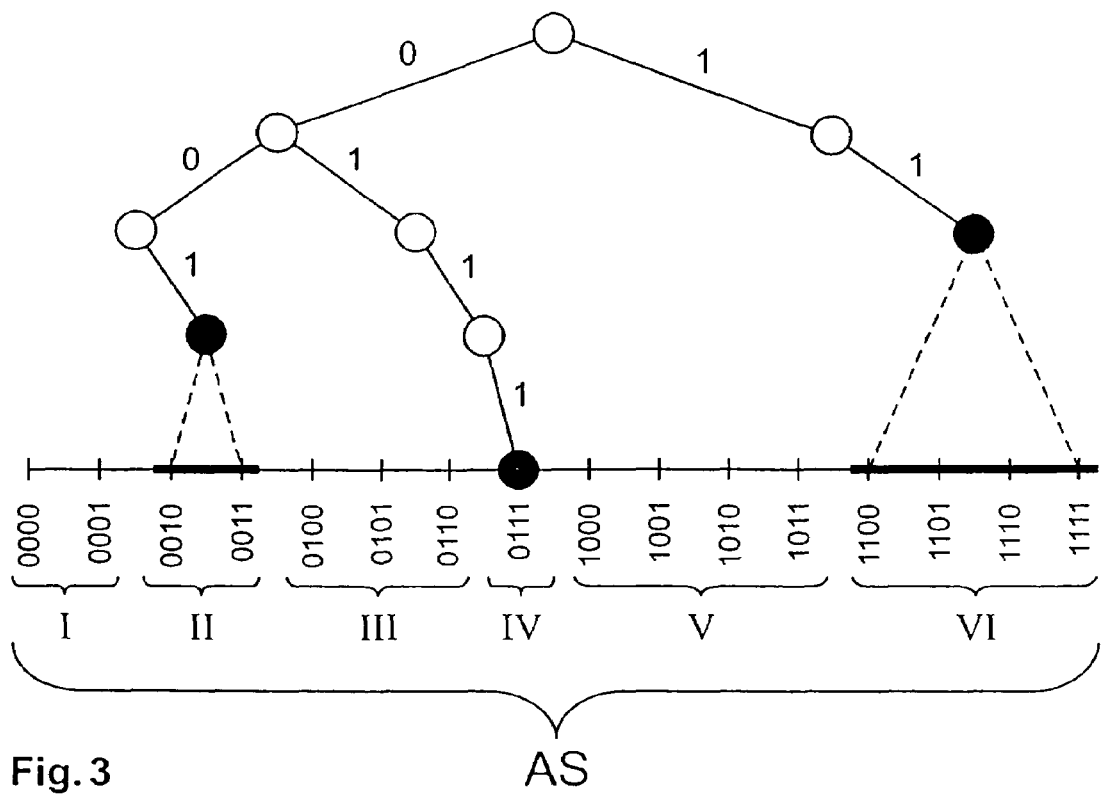
FIG. 3 shows a tree diagram of an address space covered by an exemplary set of entries in a routing table.

FIG. 3 shows the corresponding binary tree and the portions of the 4-bit address space AS that are covered by these prefixes. The 4-bit address space AS comprises here six portions I, II, III, IV, V, VI, three of which, I, III, V are not covered by the prefixes. These uncovered portions I, III, V of the address space AS correspond to the default route. The default route is the route that is selected when no matching prefix is found in the routing table $L_2$. The uncovered address space comprises here the addresses "0000", "0001", "0100" to "0110", and "1000" to "1011". These addresses and address intervals can also be represented by a set of prefixes, being referred to as default-route-prefixes. If all those default-route-prefixes would be added to the routing table $L_2$ then always a matching prefix will be found during the second lookup step 2. This would eliminate the notion of a default-route corresponding to the situation that no matching prefix is found.

However, the total number of those default-route-prefixes very likely outnumbers the number of the non-default-route prefixes in actual routing tables. It would therefore be impractical to add all default-route-prefixes to the routing table $L_2$ because this would significantly increase the required storage capacity of the routing table $L_2$ and degrade the update performance. Instead, the following approach is taken here. The data packet arrives with its destination address. The first lookup step 1 is performed on the routing table cache $L_1$. During the first lookup step 1, for the destination address a matching prefix is searched in the routing table cache $L_1$. Assuming that the first lookup step 1 on the routing table cache $L_1$ results in a miss, i.e. no matching prefix is found, the second lookup step 2 is performed. The second lookup step 2 is executed on the routing table $L_2$. Assuming that the lookup step 2 on the routing table $L_2$ does not result in a matching prefix, this means that the arrived data packet will be routed according to the default route. In the default-route determination step 3 a default-route-prefix $P_d$ is derived. Hence, in this step, for the destination address lacking a matching prefix, the default-route-prefix $P_d$ is determined.

Figure 4:
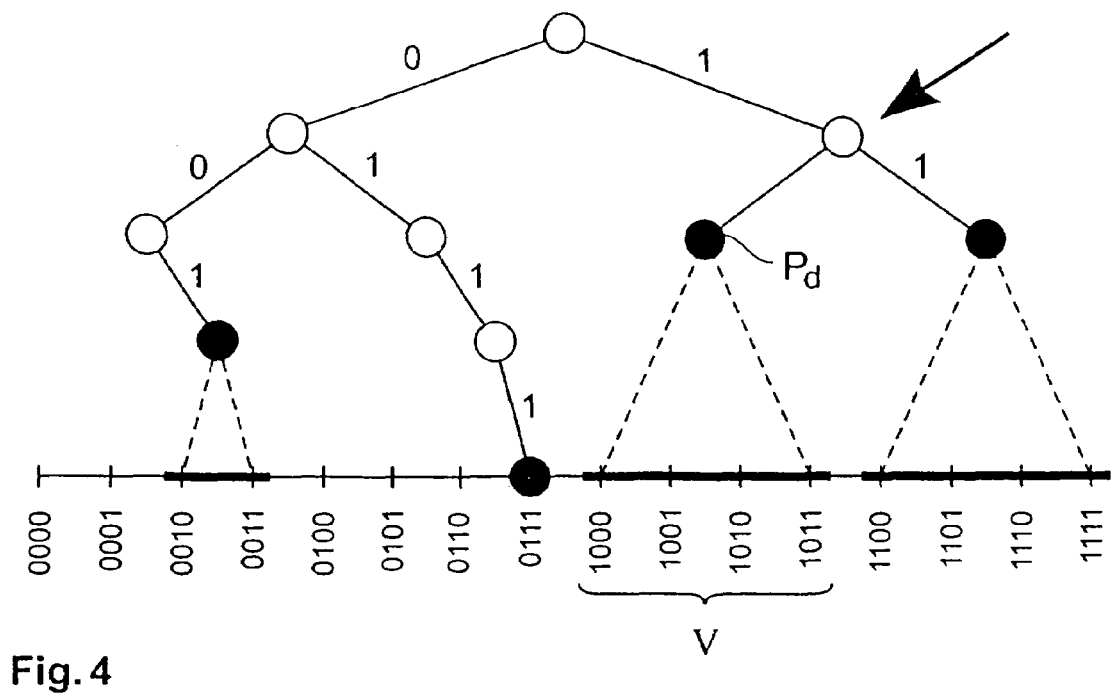
FIG. 4 shows the tree diagram of FIG. 3 with a default path entry.

FIG. 4 shows an example of how the default-route-prefix $P_d$ can be derived on-the-fly during the lookup step 2 on the binary tree shown in FIG. 3. This example involves the use of a search key "1010", i.e. corresponding to the situation that the data packet has arrived with the destination address "1010". The lookup step 2 will stop in the tree node that is pointed to in FIG. 1 by the large arrow, because of the second search key bit being a "0". Thereafter, all the search key bits up to and including the bit on which the lookup step 2 was stopped because it did not match with a subsequent child node, are determined to be the default-route-prefix $P_d$. This default-route-prefix $P_d$ is the shortest possible default-route-prefix $P_d$ that covers only destination addresses that have no matching prefix in the routing table $L_2$.

In the default-route caching step 4, the default-route-prefix $P_d$ is entered as an entry into the routing table cache $L_1$, together with the default routing destination. Storing the default-route-prefix $P_d$, that covers more than one destination address, in the routing table cache $L_1$, saves storage space since for several destination addresses only one entry resides in the routing table cache $L_1$.

The default-route-prefix $P_d$ equals "10" in the example given in FIG. 4, covering four destination addresses. In FIG. 4 this default-route-prefix $P_d$ is shown together with the portion of the address space that it covers. In this example, the address space covered by the default-route-prefix $P_d$ equals the uncovered portion V of the address space AS.

The default-route-prefix $P_d$ will only be entered into the routing table cache $L_1$ and not be stored as an actual prefix in the routing table $L_2$. For later arriving data packets, the search keys that fall into the portion V of the address space AS covered by this particular default-route-prefix $P_d$ will experience a cache hit as long as this default-route-prefix $P_d$ stays cached. Such search keys are likely to occur when so called locality of reference exists, which is a main motivation for using a cache.

This means that for the next data packet, in the event that the destination address is not included in the routing table $L_2$, but in the event that the destination address is nevertheless included in the address space covered by the default-route-prefix $P_d$ whose entry is in the routing table cache $L_1$, the first lookup step 1 will result in a cache hit and lead to the destination forwarding step 7 that directly forwards the data packet to the default routing destination, without having had to execute the second lookup step 2. Each default-route-prefix entry in the routing table cache $L_1$, can in principle have a different default routing destination. For such case, it may also be of advantage not to store one entry for the shortest-possible default-route-prefix $P_d$ in the routing table cache $L_1$, but to split the address space it covers up into several address spaces covered by several default-route-prefix entries with different destination addresses.

Figure 5:
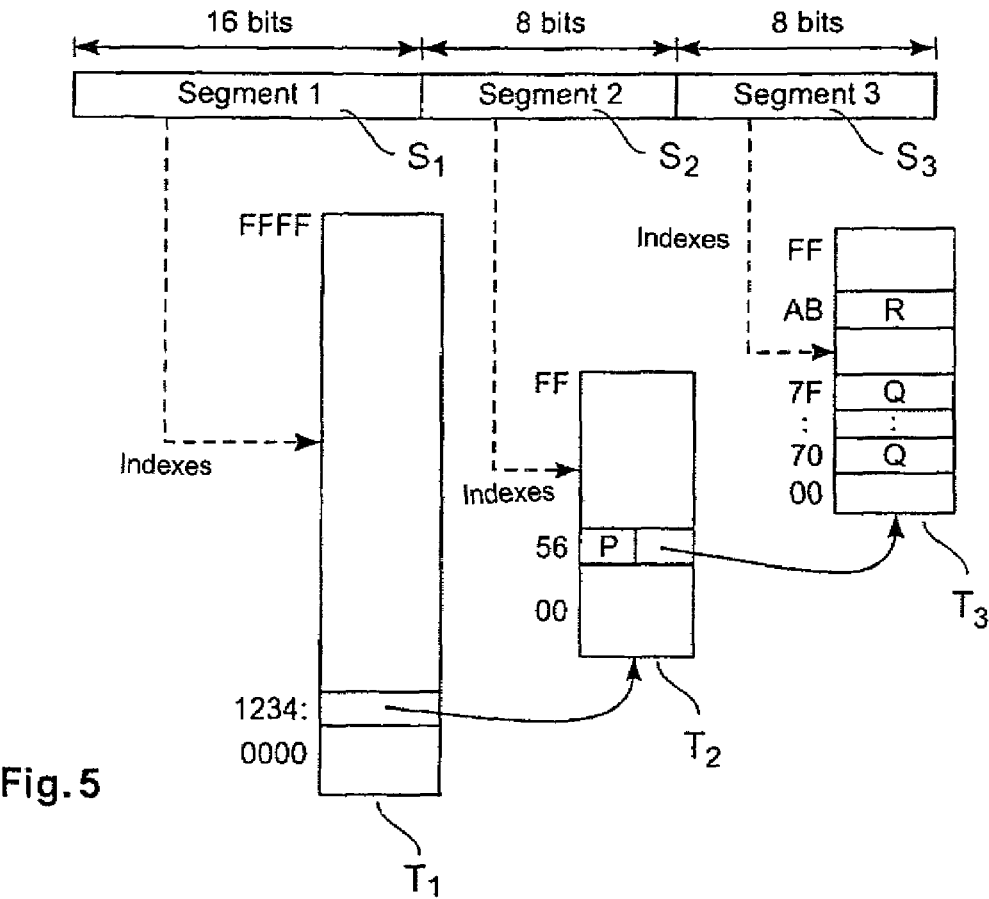
FIG. 5 shows a block diagram of a multi-bit address space covered by an address.

The default-route-prefix $P_d$ can be derived in a similar manner in an arrangement of a multi-bit trie. FIG. 5 shows an example of such a trie, implemented as a data structure in which search key segments of an IPv4 destination address are used to index tables that are linked together to form a hierarchical structure. The IPv4 destination address comprises a first segment $S_1$, a second segment $S_2$, and a third segment $S_3$. The first segment $S_1$ covers the address space of a first table $T_1$, the second segment $S_2$ covers the address space of a second table $T_2$, and the third segment $S_3$ covers the address space of a third table $T_3$.

The data structure in FIG. 5 includes the following prefixes in hexadecimal notation:

| prefix | prefix length | search result |
| --- | --- | --- |
| 123456 | 24 | P |
| 1234567 | 28 | Q |
| 123456AB | 32 | R |

Figure 6:
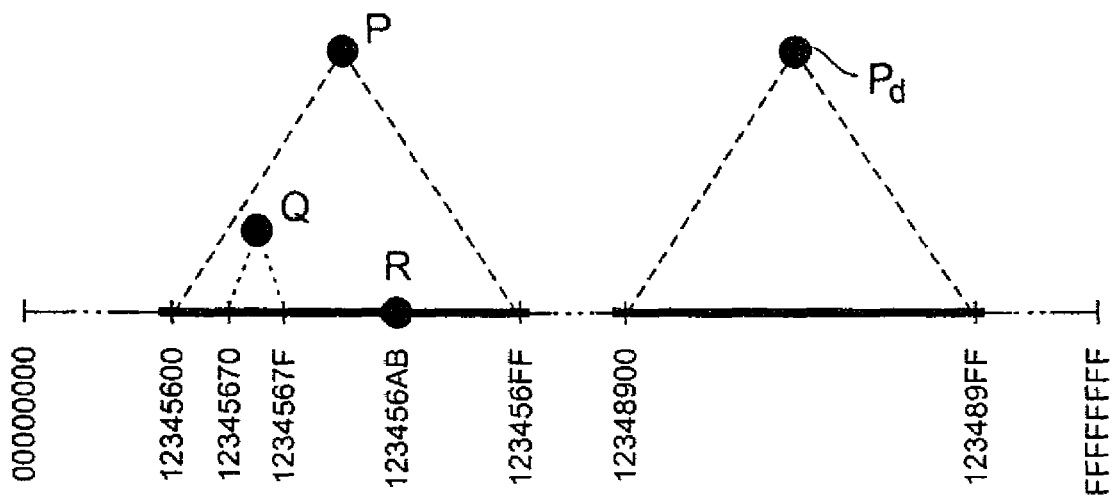
FIG. 6 shows a tree diagram of the address space pertaining to FIG. 5.

FIG. 6 illustrates the portions of the 32-bit address space that are covered by these prefixes. Taking an example of a lookup on an IPv4 destination address "123489AB", the lookup step 2 will not find a matching prefix in this data structure. This lookup step 2 will stop in the table that is indexed by the second IPv4 destination address segment $S_2$, since this table does not include a valid entry at the offset "89". The only valid entry is included at the offset "56". The default-route-prefix is here determined by taking all the IPv4 address segments up to the one that caused the lookup step 2 to stop. In this example, the default-route-prefix would consist of the first segment $S_1$ and the second segment $S_2$ of the IPv4 destination address, resulting in a default-route-prefix "123489". The portion of the address space covered by this default-route-prefix is illustrated in FIG. 6 and ranges from "12348900" to "123489FF".

The above method hence can be summarized in that a default-path entry is created in the routing table cache $L_1$ upon a data packet having been recognized as having to be forwarded along the default-path. The default path entry is advantageously the shortest possible path covering only destination addresses that pertain to the default path. Thereby, the processing time for subsequent data packets with their destination address being covered by the default path is reduced.

Figure 7:
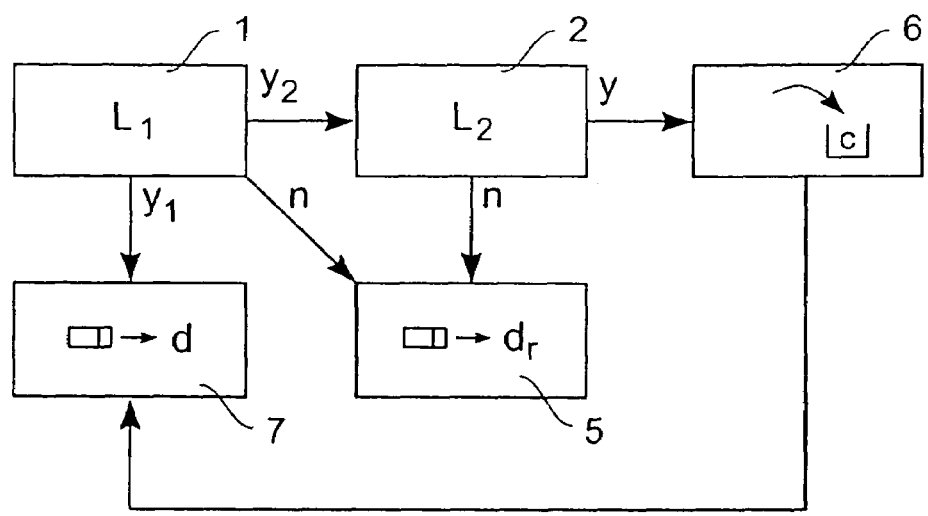
FIG. 7 shows a flow diagram of an alternative method for accelerating default-route packet-forwarding.

In FIG. 7 a flow diagram of the steps of a method for accelerating default-route packet-forwarding is shown. As far as identical steps are performed, the reference numbers of FIG. 1 have been maintained. In the first lookup step 1 the destination address of the data packet is used for searching a thereto-matching destination address prefix in the routing table cache $L_1$. For the searching there exist three possible results:

A cache hit can occur, i.e. a valid destination address prefix can be found, designated with $y_1$ in FIG. 7. In this case, the data packet will be forwarded in the destination forwarding step 7 to the corresponding destination address.

In a second possible result, a cache miss can be the case, designated with n in FIG. 7. In that case, the routing table $L_2$ need not be searched and the data packet is forwarded to the default routing destination in the default forwarding step 5.

In a third possible search result, a covering path entry can be found, designated with $y_2$ in FIG. 7. In that case, the routing table $L_2$ need be searched in order to know whether within the coverage of the covering path entry there is a valid destination address prefix for the destination address or not. Hence in this case the second lookup step 2 is performed. If that step results in a hit, designated with y in FIG. 7, the found destination address prefix is entered into the routing table cache $L_1$ in the cache update step 6 and the data packet will be forwarded to the corresponding destination address in the destination forwarding step 7. If the second lookup step 2 results in a miss, designated with n in FIG. 7, the data packet is forwarded to the default routing destination in the default forwarding step 5.

In this example the routing table cache $L_1$ stores not only the entries of destination addresses but also additional entries that cover all prefixes that exist in the routing table $L_2$, herein referred to as covering path entries. When a covering path entry is found as a result of the first lookup step 1, i.e. being a cache hit, only then will a lookup operation on the routing table $L_2$ be performed. This lookup can still result in the default route. However, with this method a cache miss relates always to the default route.

Figure 8:
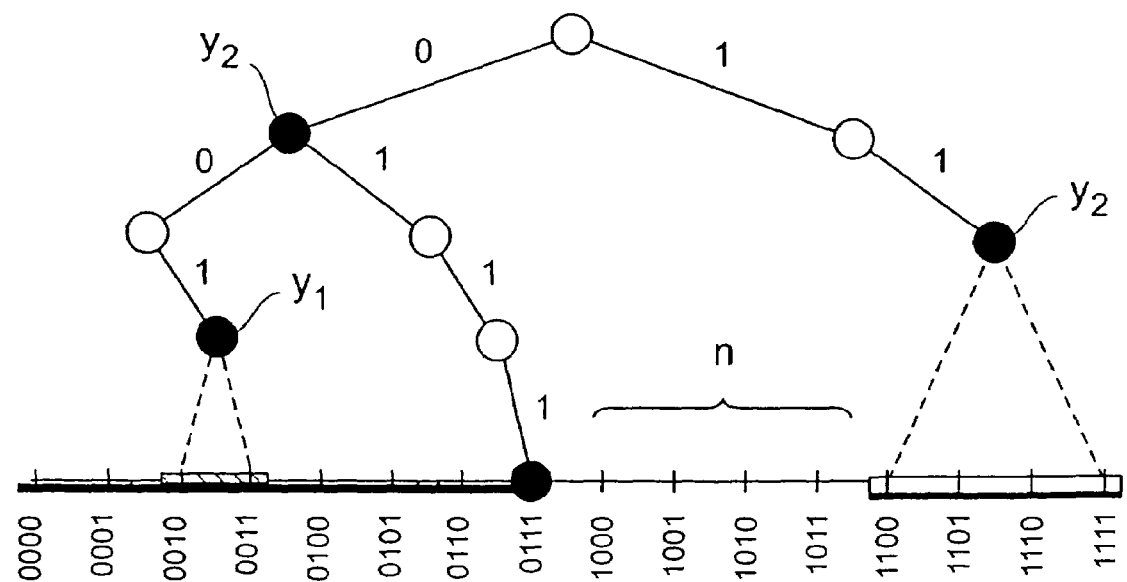
FIG. 8 shows a tree diagram of an address space covered by an exemplary set of entries in a routing table with cache entries in accordance with the method of FIG. 7.

In FIG. 8 an example is illustrated giving an address space for a four-bit tree. The covering path prefixes stored in the routing table cache $L_1$ to cover all valid prefixes are designated with $y_2$. The covering path prefixes are stored in the routing table cache $L_1$ at the time when the routing table is loaded with valid destination address prefixes. Updating of the covering path prefixes is only necessary when the routing table $L_2$ content is changed. The length of the covering path prefixes can be selected. The longer the covering path prefix, the more such covering path prefixes will be necessary to cover all valid destination address prefixes in the routing table $L_2$ and on the other hand the lower is the probability of the $y_2$ case, which is the case when the second lookup step 2 is performed. The selection of the length of the covering path prefix is hence a tradeoff between cache size to maintain the covering path prefixes and processing time for the lookup operation. It is seen as an advisable solution to select the length of the covering path prefixes such that the ratio between the valid destination address prefixes and the default routing destinations covered by that covering path prefix is at least 1:2.

Comparing this method with the method depicted in FIG. 1, it becomes apparent that the result $y_1$ in the first lookup step 1 in FIG. 7 is equivalent to the result y in the first lookup step 1. The result n in the first lookup step 1 in FIG. 7 is equivalent to the result n in the first lookup step 1 combined with the result n in the second lookup step 2. It is possible to add to the method of FIG. 7 the default-route determination step 3 and the default-route caching step 4. The result $y_2$ in the first lookup step 1 in FIG. 7 is equivalent to the result n in the first lookup step 1, searching in the second lookup step 2, resulting in y, and arriving at the cache update step 6.

This method breaks with the traditional notion of a cache, as the routing table cache $L_1$ is now used as an isolated buffer memory, and the routing table $L_2$ is only accessed when this is directed specifically by the output of the cache lookup. This method is combinable with the method described in conjunction with FIG. 1.

Another possibility to enter the default-route-prefix $P_d$ into the routing table cache $L_1$ is to not wait until a data packet arrives, but to perform an upfront check on the routing table $L_2$ in which the address space of the routing table $L_2$ is analyzed for valid destination address prefixes, and uncovered prefixes are used for determining default-route-prefixes $P_d$ therefor and creating an entry comprising the default-route-prefix $P_d$ together with a default routing destination, in the routing table cache $L_1$. This is also referred to as prefetching method and it has the advantage of enabling faster data packet processing. It may even be combined with the data-packet triggered determination of the default-route-prefix $P_d$, in that only a part of the uncovered prefixes is subjected to the prefetching method and the rest is subject to the data-packet triggered determination. Prefetching provides to be more advantageous for the parts of the address space that can be covered by a short default-route-prefix $P_d$, since that prefix uses reduced table space. Having used the prefetching method, a default-route-prefix $P_d$ already resides together with a default routing destination as an entry in the routing table cache $L_1$, at the time of arrival of the data packet and in the event that the default-route-prefix $P_d$ matches with at least part of the destination address d, in the default forwarding step 5 the data packet is forwarded to the corresponding default routing destination.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

We claim:

1. A method comprising:

processing a data packet, having a destination IP address (d), towards a routing destination;

determining a default-route-prefix ($P_d$) that is a part of the destination IP address (d) and is provided only in a routing table cache ($L_1$) during a default-route determination step, when in the routing table cache ($L_1$) and in a routing table ($L_2$), there is no entry with a destination address prefix that is a prefix of the destination IP address (d), wherein the default-route-prefix ($P_d$) is a shortest prefix that covers only destination IP addresses that have no matching prefix in the routing table ($L_2$), wherein the routing table cache ($L_1$) comprises a prefix that is a part of another destination IP address and the destination IP address (d);

performing a first lookup step for the destination IP address (d), the destination address prefix being a prefix of the destination IP address (d) is searched in the routing table cache ($L_1$), and, if said first lookup step results in not finding such destination address prefix, performing a second lookup step for said destination IP address (d), the destination address prefix being a prefix of the destination IP address (d) is searched in the routing table ($L_2$), wherein if the second lookup step on the routing table ($L_2$) results in finding the destination address prefix being said prefix of the destination IP address (d) a matching destination address prefix, the found destination address prefix entry is entered into the routing table cache ($L_1$) in a cache update step, and the data packet is forwarded in a destination forwarding step to a corresponding routing destination.

2. The method as recited in claim 1, wherein the default-route-prefix ($P_d$) is determined to be said prefix of at least the destination IP address (d).

3. The method as recited in claim 1, wherein if the second lookup step results in not finding the destination address prefix being said prefix of the destination IP address (d), in a default forwarding step the data packet is forwarded to a default routing destination.

4. The method as recited in claim 1, wherein in a default-route caching step, the default-route-prefix ($P_d$) is entered together with a default routing destination as an entry into the routing table cache ($L_1$).

5. The method as recited in claim 1, wherein in the first lookup step the routing table cache ($L_1$) is searched for covering path entries that reside in the routing table cache ($L_1$), the covering path entries covering all prefixes that exist in the routing table ($L_2$).

6. The method as recited in claim 5, wherein in an event that the first lookup step results in finding no covering path entry for the destination IP address (d), the data packet is forwarded to a default routing destination in a default forwarding step.

7. The method as recited in claim 5, wherein in an event that the first lookup step results in finding one of said covering path entry for the destination IP address (d), in the second lookup step for said destination address (d) the destination address prefix being said prefix of the destination address (d) is searched in the routing table ($L_2$).

8. The method as recited in claim 1, wherein in an event that the first lookup step results in finding the destination address prefix being said prefix of the destination IP address (d), the data packet is forwarded in a destination forwarding step to a corresponding routing destination.

9. A computer program product comprising a computer usable medium having computer readable program code means embodied therein for causing a processing of a data packet, the computer readable program code means in said computer program product comprising computer readable program code means for causing a computer to effect the steps of claim 1.

10. An apparatus for routing data packets comprising:

a router device for processing a data packet, said data packet having a destination IP address (d), towards a routing destination; and said router device having an associated memory for supporting routing table cache ($L_1$) and routing table ($L_2$);

means implemented by said router device for determining a default-route-prefix ($P_d$) that is a part of the destination IP address (d) and is provided only in the routing table cache ($L_1$) during a default-route route determination step, when in the routing table cache ($L_1$) and in the routing table (L2), there is no entry with a destination address prefix that is a prefix of the destination IP address (d), wherein the default-route-prefix ($P_d$) is a shortest prefix that covers only destination IP addresses that have no matching prefix in the routing table ($L_2$), wherein the routing table cache ($L_1$) comprises a prefix that is a part of another destination IP address and the destination IP address (d), wherein said means implemented by said router device performs a first lookup step for the destination IP address (d), the destination address prefix being a prefix of the destination IP address (d) is searched in the routing table cache ($L_1$), and, if said first lookup step results in not finding such destination address prefix, said means implemented by said router device performs a second lookup step for said destination IP address (d), the destination address prefix being a prefix of the destination IP address (d) is searched in the routing table ($L_2$), wherein if the second lookup step in the routing table ($L_2$) results in finding the destination address prefix being said prefix of the destination IP address (d) a matching destination address prefix. the found destination address prefix entry is entered into the routing table cache (L1) in a cache update step, and the data packet is forwarded in a destination forwarding step to a corresronding routing destination.

* * * * *